United States Patent Office 2,931,769
Patented Apr. 5, 1960

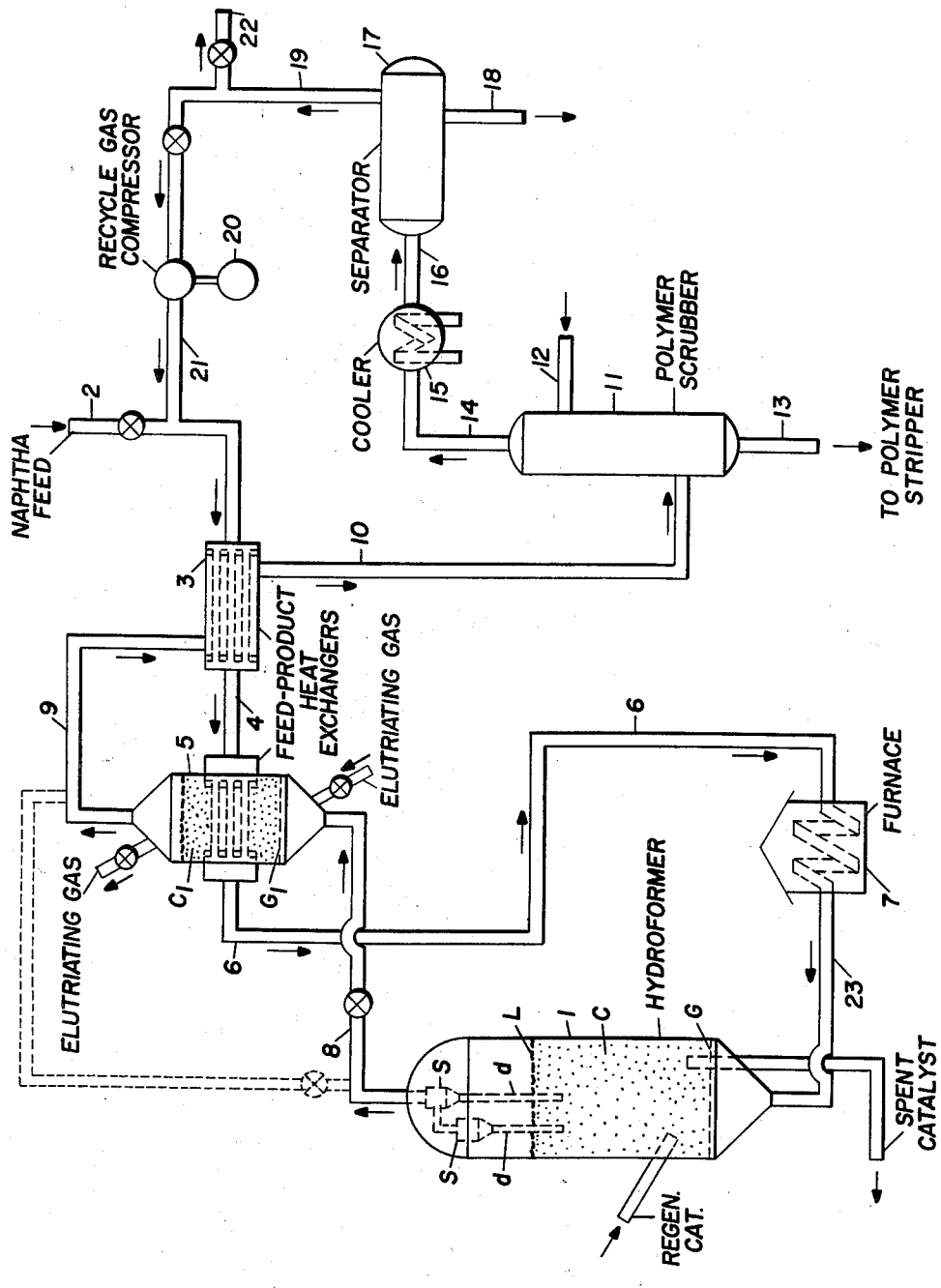

2,931,769

HYDROFORMING OF A NAPHTHA WITH HEAT EXCHANGE OF THE PRODUCTS WITH THE FEED

Sumner B. Sweetser, Cranford, N.J., assignor to Esso Research Engineering Company, a corporation of Delaware Application December 1, 1955, Serial No. 550,273

7 Claims. (Cl. 208—99)

The present invention relates to improvements in hydroforming. More particularly the present invention relates to improvements in hydroforming with respect to improving the efficiency of hot products heat exchangers to increase the heat transfer coefficient thereof, and to stabilize the product.

In hydroforming plants utilizing a fluidized bed of catalyst it is conventional practice to pass the hot effluent product from the reaction zone in heat exchange relationship with the feed naphtha and the recycle gas in order to recover the sensible heat of the said hot products. Experience has shown that small amounts of catalyst are entrained in the hot products and these particles of catalyst deposit on the heat exchanger tubes and of course lower the heat transfer coefficient. This undesirable effect requires either frequent cleaning of the tubes or operating with very low heat transfer coefficients.

It has also been observed that hydroformed products, particularly those products formed in the presence of a fluidized bed of a hydroforming catalyst, tend to have small percentages of unsaturated hydrocarbons and these hydrocarbons tend to form gums in storage and thus the hydroformed product has poor stability. It is believed that the presence of these gum forming constituents in the hydroforming naphtha results from a comparatively long residence time of the hydroformed products in the disperse phase in the reactor above the dense fluidized bed or in other words in the light suspension of catalyst in vapors which is present in the upper portion of the reaction zone. Therefore, in order to improve the stability of the hydroformed products, particularly for use in the manufacture of aviation fuels, it is sometimes necessary to treat them with hydrogen in a separate vessel.

It is the main object of the present invention to provide means for maintaining the heat exchanger through which the hot products from the reaction zone and the cold naphtha feed pass in heat exchange relationship at a high level of efficiency.

It is a further object of the present invention to maintain the hot product heat exchanger at a high level efficiency so that it becomes possible to utilize heat exchangers of smaller heat exchange surface than has been heretofore required.

Another object of the present invention is to improve the stability of a hydroformed product.

Other and further objects of the invention will appear in the following detailed description and claims when read in conjunction with the accompanying drawing.

In the drawing there is depicted diagrammatically the essential apparatus in which a preferred modification of the present invention may be carried into effect.

Referring in detail to the drawing, 1 represents a hydroforming reactor of conventional design. The reactor contains a fluidized bed C of catalyst which extends from a grid or other gas distributor G to an upper dense phase level L. The catalyst which may be any conventional hydroforming catalyst, for example, molybdenum oxide carried on a suitable spacing agent such as active alumina, is ground to a particle size distribution which renders it suitable to be maintained in the form of a fluidized bed in reactor 1. This particle size distribution as well as the operating conditions of temperature, pressure, superficial gas or vapor velocities, etc. maintained in reaction zone 1 are well known and have been fully described in the prior art and per se form no essential part of the present invention.

In operation cold feed naphtha enters the present system through line 2 and thence passes through the tube side of the first of two heat exchangers 3 through which product from reaction zone 1 passes through the shell side of the said heat exchanger. The partially heated naphtha feed is withdrawn from heat exchanger 3 through line 4 and passed through the tube side of a second heat exchanger 5, through the shell side of which, hot hydroformed product passes. The thus preheated naphtha is withdrawn from heat exchanger 5 through line 6 and forced through a furnace 7 wherein it is heated to reaction temperatures and thence passed into the bottom of reactor 1. In reactor 1 the feed naphtha flows upwardly in contact with the fluidized bed of catalyst under known hydroforming conditions as aforesaid for a sufficient period of time to effect the desired conversion. The hydroformed product passes from the dense fluidized bed upwardly through a catalyst disengaging space positioned in reactor 1 in the space between L and the top of the reactor. In this space the main bulk of the catalyst is separated from the vapors and gases and gravitates toward the dense fluidized bed of catalyst C. It is conventional practice however to cause the gases and vapors to pass from the reactor through one or more gas-solids separating devices or "cyclones," wherein further separation of the catalyst solids from gasiform and vapor material is effected and the separated catalyst material is returned to the dense fluidized bed through 1 or more pipes $d$. The vapors and gasiform material pass from the reactor via line 8 and thence pass through the shell side of heat exchanger 5.

The tubes of heated exchanger 5 are disposed as shown in the drawing, in horizontal position and they are immersed in a fluidized bed $C_1$ of relatively coarse catalyst. The catalyst in bed $C_1$ performs a dual function in that its turbulent motion causes the scrubbing or scouring of the tube surfaces thus maintaining them substantially free of catalyst coatings, and at the same time, at the catalyst serves to catalyst or promote a "hydrofining" of the naphtha by the hydrogen which is present in admixture with the hydroformed product. The hydrofined or stabilized hydroformed product is withdrawn from heat exchanger 5 via line 9 and passed through the shell side of heat exchanger 3, thence passed via line 10 into a polymer scrubber 11 wherein it is contacted with a scrubbing oil such as a gas oil initially or later an accumulated polymer product. Removed polymer which is formed in relatively small amounts is withdrawn from bottom scrubber 11 via line 13 and this polymer may be rejected from the system. The scrubbed product is withdrawn overhead from scrubber 11 via line 14 thence passed through a condenser 15 wherein it is cooled to a temperature of about 100° F. thence passed via line 16 into a separation drum 17. Hydroformed product is withdrawn from separator 17 through line 18 and passed to product storage (not shown). Recycle gas, that is to say gas containing a preponderance of hydrogen, is withdrawn overhead from separator 17 through line 19 thence passed through a recycle gas compressor 20, thereafter mixer with the naphtha feed in line 2 and returned to reactor 1. Excess hydrogen may be rejected from the system through line 22.

It will be obvious to the experienced petroleum engineer that many modifications of the plant layout indicated in the drawing and described in words herein may be made without departing from the spirit of the invention. In the drawing the tubes in heat exchangers 5 and 3 are shown as disposed in horizontal position. It is obvious that these tubes may be disposed in a vertical position. Furthermore, as is well known in the art, the catalyst C in reactor 1 unavoidably becomes contaminated by the deposition of carbonaceous and, in some cases, sulfur deposits thereon. Consequently it is conventional practice to withdraw the catalyst from reactor 1 and transfer it to a regeneration zone (not shown) wherein the catalyst is treated at a temperature of 1000 to 1100° F. with air, whereupon these deposits are consumed by combustion and the catalyst activity thereby substantially renewed. The hot regenerated catalyst is then returned to the reaction zone supplying at least a portion of the heat necessary to support the endothermic reaction of hydroforming.

In the drawing two stages of heat exchangers are shown, the second exchanger (exchanger #3) being of conventional tube and shell type. In the case where a relatively coarse catalyst is used in the first heat exchanger (heat exchanger #5), in some cases it may be desirable occasionally to remove fines from the fluidized bed $C_1$ by elutriation. In this case no catalyst fines will pass to heat exchanger 3 so that the conventional type may be here employed. Periodically, it is desirable to remove the fines from bed $C_1$ and this may be accompanied by by-passing the crude product in line 8 around heat exchanger 5 and passing a gas upwardly through the bed of catalyst $C_1$ to remove the said fines by elutriation.

According to the improved method herein above described a combination heat exchanger system and naphtha treater cooperate to maintain the heat exchanger tubes in a clean condition so that less heat transfer surface is required and, at the same time, the crude products from the hydroforming reaction are substantially improved in stability. In addition, since the coarse catalyst used in the first stage heat exchanger acts as a filter of catalyst fines in the product, one or more stages of "cyclones" in the hydroformer reactor may be eliminated.

In order to show the utility of the present invention attention is directed to the operation of a large pilot plant utilized for hydroforming naphthas in the presence of a fluidized bed of catalyst. In accordance with the method indicated in the accompanying drawing, it was found that at the beginning of operation when the tubes were relatively clean the heat transfer coefficients in the product-feed-heat exchangers were in the range of about 150 to 200 B.t.u. per hour per square foot of surface per ° F. After a few days, however, the heat transfer coefficient dropped during the operation to a range of from about 25 to 50 B.t.u. per hour per square foot per ° F. By utilizing the heat exchanger system described above, heat transfer coefficients were maintained at the initial high level. Furthermore, the heat transfer surfaces in the two heat exchangers should be adjusted so that the products in the first stage (heat exchanger 5) would be hydrofined at a temperature in the range of from about 550 to 800° F., preferably in the range of from about 600 to 700° F. With respect to the pressure in the hydrofining zone the same may be within the range of from about 50 to 400 p.s.i.g. With respect to feed rates it is pointed out that good results are obtained by charging to the hydrofining zone oil at a rate of from about 2 to 10 w./hr./w., the exact feed rate being dependent on the final stability desired. It is pointed out that the hydrogen obtained from the hydroforming zone will have more than sufficient hydrogen to feed the requirements in the hydrofining zone, particularly in the case where the total effluent from the hydroformer is passed directly to the hydrofining zone, the preferred procedure herein. With respect to the catalysts employed in the hydrofining step, the same may be, in addition to cobalt molybdate, molybdenum oxide on alumina, nickel or alumina or any known hydrogenation catalyst.

In order more fully to explain and describe the present invention in the form of a preferred modification or embodiment the following specific example is set forth.

*Example*

A blend of 80% virgin naphtha and 20% of coker naphtha, which was produced in known manner by coking a topped or heavy residual petroleum oil stock in the presence of a fluidized bed of hot solids, was hydroformed in the presence of a fluidized bed of a molybdenum oxide on alumina catalyst under conventional fluid hydroforming conditions to produce a product of 100 clear Research Octane Number. The raw hydroformate, without rerunning, was hydrofined over cobalt molybdate on alumina catalyst, at a temperature of 600° F., a feed rate of 6.5 w./hr./w., a pressure of 235 p.s.i.g. and a hydrogen rate of 1000 cu. ft. per barrel, the cobalt and the molybdenum being present in substantially stoichiometric proportion and the said cobalt molybdate comprising about 11% weight of the total catalyst composition. The hydrofined products were cooled and separated from the hydrogen. A comparison of the properties of the raw and refined hydroformates is given in the following tabulation:

|  | Raw Hydroformate | Hydrofined Hydroformate |
| --- | --- | --- |
| 16 hr. potential gum test | 126 | 67 |
| Copper dish gum test | 68 | 16 |
| ASTM gum test | 68 | 28 |
| Bromine No | 1.7 | 0.5 |
| Peroxide No | 1.0 | 0.3 |

The data in the above tabulation show that in all inspection tests relating to stability the hydrofined hydroformate was substantially improved in stability over the raw hydroformate. The hydrofining conditions used in the above tests were relatively mild and where further improvement in stability is desired, it could be obtained by operating the combined heat exchanger and hydroformer at higher temperatures or at lower space rates.

In order to review briefly, the present invention relates to improvements in hydroforming and has particular reference to stabilizing the crude product, to improve the heat transfer efficiency of the equipment in which the feed oil is preheated, and to reduce the number of gas-solids separators normally employed in a fluidized catalyst process by providing a fluidized bed of catalyst which serves to filter out catalyst fines from the raw product vapors withdrawn from the hydroforming zone.

As used herein the term "coarse catalyst" signifies catalyst having a particle size material of 0–200 microns but contains not more than 2 wt. percent of material having a particle size not more than 20 microns. In this same connection, if necessary, the powdered catalyst should be elutriated to remove fines having a particle size of from 0–20 microns for use in the heat exchanger 5 as a filter medium.

Numerous modifications of this invention may be made by those familiar with the present art.

What is claimed is:

1. The method of hydroforming naphthas which comprises subjecting the naphthas to hydroforming conditions in the presence of a fluidized bed of a hydroforming catalyst in a hydroforming zone, withdrawing crude hydroformed product from the hydroforming zone, contacting withdrawn and uncooled naphtha with a fluidized bed of a hydrofining catalyst in the shell side of a tubular heat exchanger in which heat exchanger the said tubes are immersed in the fluidized bed of catalyst whereby the tube surfaces maintain a clean condition by the scouring action of the dense turbulent fluidized bed of catalyst and at the same time heat is imparted to a cold feed naphtha passing through the tube side of the said heat exchanger, permitting the crude hydroformed product to contact the said catalyst at elevated temperature in the presence of hydrogen in said heat exchanger whereby the said hydroformed product is hydrofined and recovering a stable hydrofined hydroformate.

2. The method of hydroforming naphthas which comprises subjecting the naphthas to hydroforming conditions in the presence of a fluidized bed of a hydroforming catalyst in a hydroforming zone, withdrawing crude hydroformed product from the hydroforming zone, contacting withdrawn and uncooled naphtha with a fluidized bed of a coarse hydrofining catalyst in the shell side of a tubular heat exchanger in which heat exchanger the said tubes are immersed in the fluidized bed of catalyst whereby the tube surfaces maintain a clean condition by the scouring action of the dense turbulent fluidized bed of catalyst and at the same time heat is imparted to a cold feed naphtha passing through the tube side of the said heat exchanger, permitting the crude hydroformed product to contact the said catalyst at elevated temperature in the presence of hydrogen in said heat exchanger whereby the said hydroformed product is hydrofined and recovering a stable hydrofined hydroformate.

3. The method set forth in claim 2 in which raw product from the hydroforming zone passes through the fluidized bed in the heat exchanger and fines entrained in said product are removed therefrom by the filtering action of the said fluidized bed in the heat exchanger.

4. The method set forth in claim 3 in which periodically fines in the fluidized bed of catalyst in the said heat exchanger are removed by elutriation.

5. The method of hydroforming naphthas which comprises subjecting the naphthas to hydroforming conditions in the presence of a fluidized bed of a hydroforming catalyst in a hydroforming zone, withdrawing crude hydroformed product from the hydroforming zone, contacting withdrawn and uncooled naphtha with a fluidized bed of a hydrofining catalyst in the shell side of a tubular heat exchanger in which heat exchanger the said tubes are immersed in the fluidized bed of catalyst whereby the tube surfaces maintain a clean condition by the scouring action of the dense turbulent fluidized bed of catalyst and at the same time heat is imparted to a cold feed naphtha passing through the tube side of the said heat exchanger, permitting the crude hydroformed product to contact the said catalyst at elevated temperature in the presence of hydrogen in said heat exchanger whereby the said hydroformed product is hydrofined, removing the hydrofined product from the hydrofining zone, causing it to flow to a second stage heat transfer zone, thereafter passing the cooled product to a scrubbing zone, treating the said product with a scrubbing oil to remove polymer and recovering a stable hydrofined hydroformate.

6. The method of hydroforming naphthas which comprises subjecting the naphthas to hydroforming conditions in the presence of a fluidized bed of a hydroforming catalyst in a hydroforming zone, withdrawing crude hydroformed product from the hydroforming zone, contacting withdrawn and uncooled naphtha with a fluidized bed of a coarse hydrofining catalyst in the shell side of a tubular heat exchanger in which heat exchanger the said tubes are immersed in the fluidized bed of catalyst whereby the tube surfaces maintain a clean condition by the scouring action of the dense turbulent fluidized bed of catalyst and at the same time heat is imparted to a cold feed naphtha passing through the tube side of the said heat exchanger, permitting the crude hydroformed product to contact the said catalyst at elevated temperature in the presence of hydrogen in said heat exchanger whereby the said hydroformed product is hydrofined, removing the hydrofined product from the hydrofining zone, causing it to flow to a second stage heat transfer zone, thereafter passing the cooled product to a scrubbing zone, treating the said product with a scrubbing oil to remove polymer and recovering a stable hydrofined hydroformate.

7. The method of hydroforming hydrocarbons boiling within the gasoline boiling range which comprises providing a hydroforming zone containing a dense fluidized bed of hydroforming catalyst and superposed above the upper level of said dense phase a dilute phase suspension of catalyst in vaporiform material, the latter phase serving as a catalyst disengaging space, subjecting preheated hydrocarbons charged to said hydroforming zone at a lower point of said dense fluidized bed of catalyst therein, to the influence of hydroforming conditions of temperature, pressure, and contact time with the said catalyst to effect the desired conversion, causing the raw product to pass upwardly from the dense fluidized bed of catalyst through the said catalyst disengaging space wherein a substantial portion of the catalyst is separated from the vaporiform material, thereafter causing the said vaporiform material to pass through gas-solids separating devices to remove a portion of catalyst fines entrained in said vaporiform material, withdrawing vaporiform material containing a substantial amount of entrained catalyst fines, causing the withdrawn material to contact a fluidized bed of coarse hydrofining catalyst disposed in the shell side of a tubular heat exchanger wherein catalyst fines entrained in the said vaporiform material are substantially completely removed by the filtering action of the said fluidized bed of coarse catalyst and the tubes of said exchanger are maintained in a relatively clean condition as to their outside surfaces by the scouring action of the said fluidized catalyst, causing said hydrocarbons to be hydroformed to pass through the tube side of said heat exchanger and thereafter to the hydroforming zone for treatment therein, maintaining the said withdrawn vaporiform material in contact with the said coarse catalytic material in the said heat exchanger for a sufficient period of time to effect hydrofining of the hydroformed product in the vaporiform material and recovering a hydrofined hydroformed product.

References Cited in the file of this patent

UNITED STATES PATENTS

| | | |
|---|---|---|
| 2,493,494 | Martin | Jan. 3, 1950 |
| 2,665,239 | Howard et al. | Jan. 5, 1954 |
| 2,710,825 | Gornowski | June 14, 1955 |
| 2,717,860 | Rex | Sept. 13, 1955 |
| 2,735,802 | Jahnig | Feb. 21, 1956 |
| 2,758,059 | Berg | Aug. 7, 1956 |
| 2,768,934 | Shapiro et al. | Oct. 30, 1956 |
| 2,773,808 | Hemminger | Dec. 11, 1956 |